United States Patent
Hamada

(10) Patent No.: US 9,300,915 B2
(45) Date of Patent: Mar. 29, 2016

(54) APPARATUS, SYSTEM, AND METHOD OF MANAGING DATA, AND RECORDING MEDIUM

(71) Applicant: Yuuta Hamada, Tokyo (JP)

(72) Inventor: Yuuta Hamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 14/484,507

(22) Filed: Sep. 12, 2014

(65) Prior Publication Data

US 2015/0077510 A1   Mar. 19, 2015

(30) Foreign Application Priority Data

Sep. 13, 2013   (JP) .................................. 2013-190865

(51) Int. Cl.
  *H04N 7/15*   (2006.01)
  *H04L 12/18*   (2006.01)
  *H04M 3/493*   (2006.01)
  *H04M 3/56*   (2006.01)
  *H04N 7/14*   (2006.01)
  *H04L 12/24*   (2006.01)

(52) U.S. Cl.
  CPC ............ *H04N 7/152* (2013.01); *H04L 12/1818* (2013.01); *H04L 41/00* (2013.01); *H04M 3/4931* (2013.01); *H04M 3/567* (2013.01); *H04N 7/147* (2013.01); *H04N 7/15* (2013.01); *H04M 2203/6009* (2013.01)

(58) Field of Classification Search
  CPC ......... H04N 7/15; H04N 7/152; H04N 7/147; H04N 7/14; H04L 12/1817; H04L 41/00; H04M 3/4931; H04M 3/567; H04M 2203/6009

USPC ............ 348/14.01–14.16; 709/204; 715/752; 370/260, 261
See application file for complete search history.

(56) References Cited

U.S. PATENT DOCUMENTS

| | | | |
|---|---|---|---|
| 2003/0079037 A1 | 4/2003 | Donnelly et al. | |
| 2012/0117238 A1* | 5/2012 | Yokoyama | H04L 41/0893 709/225 |
| 2013/0223292 A1 | 8/2013 | Okuyama et al. | |
| 2013/0242034 A1* | 9/2013 | Kato | H04N 7/15 348/14.08 |
| 2014/0362741 A1 | 12/2014 | Okuyama et al. | |

FOREIGN PATENT DOCUMENTS

| | | |
|---|---|---|
| EP | 2 765 753 A1 | 8/2014 |
| JP | 2006-074453 | 3/2006 |

(Continued)

OTHER PUBLICATIONS

Extended European Search Report issued Mar. 6, 2015 in Patent Application No. 14184002.5.

(Continued)

*Primary Examiner* — Melur Ramakrishnaiah
(74) *Attorney, Agent, or Firm* — Oblon, McClelland, Maier & Neustadt, L.L.P.

(57) ABSTRACT

In response to a request for deleting a specific management terminal from being under management of a specific administrator, a transmission management system not only deletes terminal identification information of the specific management terminal, from terminal identification information of management terminals being managed by the specific administrator, but also deletes the terminal identification information of the specific management terminal from candidate counterpart terminal identification information for the other management terminals being managed by the specific administrator.

10 Claims, 17 Drawing Sheets

(56) References Cited

FOREIGN PATENT DOCUMENTS

| | | |
|---|---|---|
| JP | 2014-155128 | 8/2014 |
| WO | WO 2012/074124 A1 | 6/2012 |

OTHER PUBLICATIONS

U.S. Appl. No. 14/484,635, filed Sep. 12, 2014.

* cited by examiner

FIG. 8

| TERMINAL ID | PASSWORD |
|---|---|
| 01aa | aaaa |
| 01ab | abab |
| 01ac | acac |
| ... | ... |

FIG. 9

| TERMINAL ID | NAME | OPERATION STATE | DATE/TIME RECEIVED | IP ADDRESS |
|---|---|---|---|---|
| 01aa | AA TERMINAL | ONLINE (COMMUNICATION OK) | 2012.08.20.13:40 | 1.2.1.3 |
| 01ab | AB TERMINAL | OFFLINE | 2012.08.19.12:00 | 1.2.1.4 |
| ... | ... | ... | ... | ... |
| 01ba | BA TERMINAL | ONLINE (INTERRUPT) | 2012.08.20.13:45 | 1.2.2.3 |
| 01bb | BB TERMINAL | ONLINE (COMMUNICATION OK) | 2012.08.20.13:50 | 1.2.2.4 |
| ... | ... | ... | ... | ... |
| 01ca | CA TERMINAL | OFFLINE | 2012.08.20.12:45 | 1.3.1.3 |
| 01cb | CB TERMINAL | ONLINE (COMMUNICATING) | 2012.08.20.13:55 | 1.3.1.4 |
| ... | ... | ... | ... | ... |
| 01da | DA TERMINAL | ONLINE (COMMUNICATING) | 2012.08.18.12:45 | 1.3.2.3 |
| 01db | DB TERMINAL | ONLINE (COMMUNICATION OK) | 2012.08.20.12:45 | 1.3.2.4 |
| ... | ... | ... | ... | ... |

FIG. 10

| STARTING TERMINAL ID | CANDIDATE COUNTERPART TERMINAL ID |
|---|---|
| 01aa | 01ab, ···, 01ba, 01bb,···, 01ca, 01cb |
| 01ab | 01aa, 01ca, 01cb |
| 01ba | 01aa, 01ab, 01ca, 01cb, 01da, 01db |
| ... | ... |

FIG. 11

| GROUP ID | GROUP NAME | TERMINAL ID OF MANAGEMENT TERMINAL |
|---|---|---|
| G001 | FIRST SALES DIVISION | 01aa, 01ab |
| G002 | SECOND SALES DIVISION | 01ba, 01bb, 01bc |
| G003 | FIRST DEVELOPMENT DIVISION | 01ca, 01cb, 01cc |
| G004 | SECOND DEVELOPMENT DIVISION | 01da, 01db, 01dc |

FIG. 12

| ADMINISTRATOR ID | PASSWORD | GROUP ID |
|---|---|---|
| 02A | AAAA | G001, G002 |
| 02B | BBBB | G003 |
| 02C | CCCC | G004 |

FIG. 17

○ TERMINAL AUTHENTICATION:

TERMINAL ID [　　　　]

PASSWORD [　　　　]

[LOG IN]

⦿ ADMINISTRATOR AUTHENTICATION:

ADMINISTRATOR ID [　　　　]

PASSWORD [　　　　]

[NEW REGISTRATION] [LOG IN]

FIG. 18

ADMINISTRATOR REGISTRATION:

ADMINISTRATOR ID [　　　　]

PASSWORD [　　　　]

PASSWORD (CONFIRM) [　　　　]

[REGISTER] [CANCEL]

FIG. 19

| MANAGEMENT TERMINAL LIST: | | | LOG OUT |
|---|---|---|---|

REGISTER MANAGEMENT TERMINAL    DELETE TERMINALS BY GROUP

FIRST SALES DIVISION | SECOND SALES DIVISION

| NAME | TERMINAL ID | CANDIDATE COUNTERPART TERMINAL ID | |
|---|---|---|---|
| AA TERMINAL | 01aa | 01ab, ⋯, 01ba, 01bb, ⋯, 01ca, 01cb | DELETE |
| AB TERMINAL | 01ab | 01aa, 01ca, 01cb | DELETE |

FIG. 21

REGISTER MANAGEMENT TERMINAL:

MANAGEMENT TERMINAL GROUP ▼
- FIRST SALES DIVISION
- SECOND SALES DIVISION
- FIRST DEVELOPMENT DIVISION
- SECOND DEVELOPMENT DIVISION

REGISTRATION TERMINAL ID [ ]
REGISTRATION TERMINAL ID [ ]
REGISTRATION TERMINAL ID [ ]

[REGISTER] [CANCEL]

FIG. 22

CONFIRM GROUP TO BE DELETED:

The following group will be deleted. OK?

GROUP ID: G001
GROUP NAME: TOKYO OFFICE

[OK] [CANCEL]

FIG. 23

CONFIRM MANAGEMENT TERMINAL
TO BE DELETED:

The following terminal will be deleted
from group "Tokyo Office". OK?

TERMINAL ID: 01ab
TERMINAL NAME: AB TERMINAL

OK    CANCEL

APPARATUS, SYSTEM, AND METHOD OF MANAGING DATA, AND RECORDING MEDIUM

CROSS-REFERENCE TO RELATED APPLICATIONS

This patent application is based on and claims priority pursuant to 35 U.S.C. §119(a) to Japanese Patent Application No. 2013-190865, filed on Sep. 13, 2013, in the Japan Patent Office, the entire disclosure of which is hereby incorporated by reference herein.

BACKGROUND

1. Technical Field

The present invention generally relates to managing candidate counterpart terminals.

2. Description of the Related Art

Communication systems that allow communication among a remotely located sites via a communication network such as the Internet have become popular. An example of such a communication system includes a videoconference system. For example, a terminal used by one of two parties that are holding a videoconference converts an image and sound of a subject in a conference room to digital data and transmits the digital data to a terminal used by the other party. The terminal used by the other party displays an image on a display and outputs sound from a speaker. Accordingly, a videoconference between remotely located sites can be held in a state that is similar to an actual conference.

In such a conference system, technology that registers a candidate counterpart terminal in a candidate list is available. Using the candidate list, a user at a terminal can easily call a terminal that serves as a candidate counterpart terminal to start communication.

On the other hand, many terminals are used in a large organization such as a company. In such environment, there is an administrator who manages terminals of users. Sometimes, the administrator may want to dispose of an old terminal being managed by the administrator, for example, to replace it with a new terminal. Even after the terminal is disposed of, that terminal continues to be registered as a candidate counterpart terminal of the other terminals that are under management of the administrator. Thus, every time the terminal is removed from the terminals being managed by the administrator, the administrator deletes that terminal not managed by the administrator, from the candidate counterpart terminal for the other terminals being managed by the administrator.

SUMMARY

In view of the above, in one aspect of the present invention, in response to a request for deleting a specific management terminal from being under management of a specific administrator, a transmission management system not only deletes terminal identification information of the specific management terminal, from terminal identification information of management terminals being managed by the specific administrator, but also deletes the terminal identification information of the specific management terminal from candidate counterpart terminal identification information for the other management terminals being managed by the specific administrator.

For example, example embodiments of the present invention include a transmission management system for managing a plurality of transmission terminals, including: a memory that stores: first association information that associates administrator identification information for identifying an administrator with management terminal identification information for identifying one or more management terminals being managed by the administrator; and second association information that associates, for each one of the plurality of transmission terminals, terminal identification information for identifying a terminal with candidate counterpart terminal identification information for identifying one or more candidate counterpart terminals, to indicate that the terminal is capable of requesting to start communication with the candidate counterpart terminals; a receiver that receives a request for deleting a specific management terminal from being under management of a specific administrator, the request including specific terminal identification information of the specific terminal to be deleted and specific administrator identification information of the specific administrator; and a processing circuitry that deletes the specific terminal identification information from the management terminal identification information being associated with the specific administrator identification information by the first association information. The processing circuitry further specifies one or more management terminals being managed by the specific administrator other than the specific terminal being deleted using the first association information, and deletes the specific terminal identification information of the specific terminal being deleted, from candidate counterpart terminal identification information associated with each one of the other management terminals by the second association information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram of a terminal authentication management database (DB);

FIG. 9 is a conceptual diagram of a terminal management DB;

FIG. 10 is a conceptual diagram of a candidate list management DB;

FIG. 11 is a conceptual diagram of a group management DB;

FIG. 12 is a conceptual diagram of an administrator management DB;

FIG. 17 is an illustration of an example authentication screen;

FIG. 18 is an illustration of an example administrator registration screen;

FIG. 19 is an illustration of an example management terminal list screen;

FIG. 21 is an illustration of an example management terminal registration screen;

FIG. 22 is an illustration of an example confirmation screen for management terminal deletion; and FIG. 23 is an illustration of an example confirmation screen for management terminal deletion.

Figure 1:
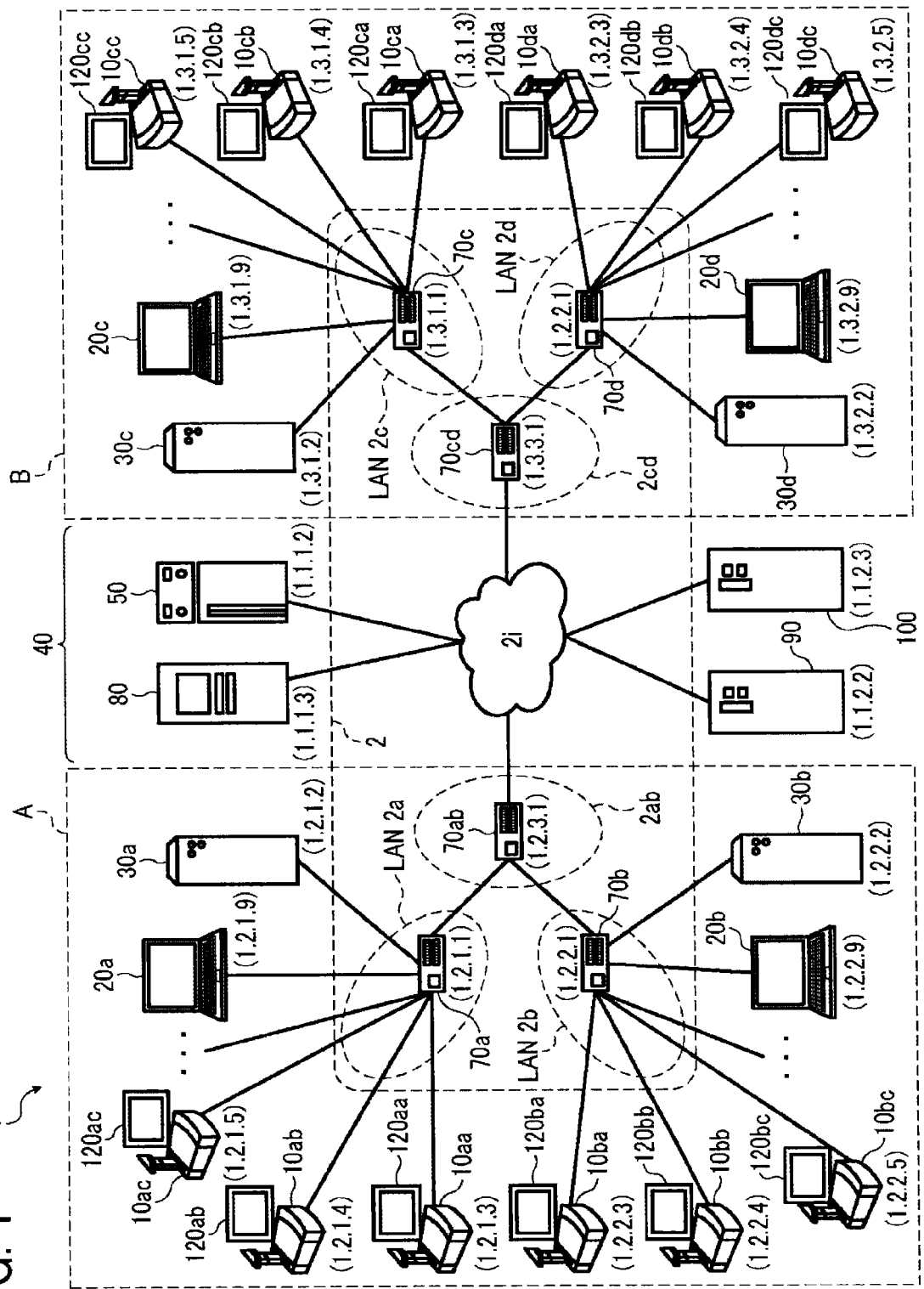
FIG. 1 is a schematic diagram illustrating a configuration of a transmission system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, a transmission system 1 is explained according to an example embodiment of the present invention.

The transmission system 1 includes a communication system that intercommunicates information or information reflecting feelings, for example, between or among terminals. In this example, the communication system is a system for intercommunicating information or information reflecting feelings, for example, between or among a plurality of communication terminals (one example of "transmission terminals") via a communication management system (one example of a "transmission management system"), and an example thereof includes a videoconference or teleconference system.

Figure 2:
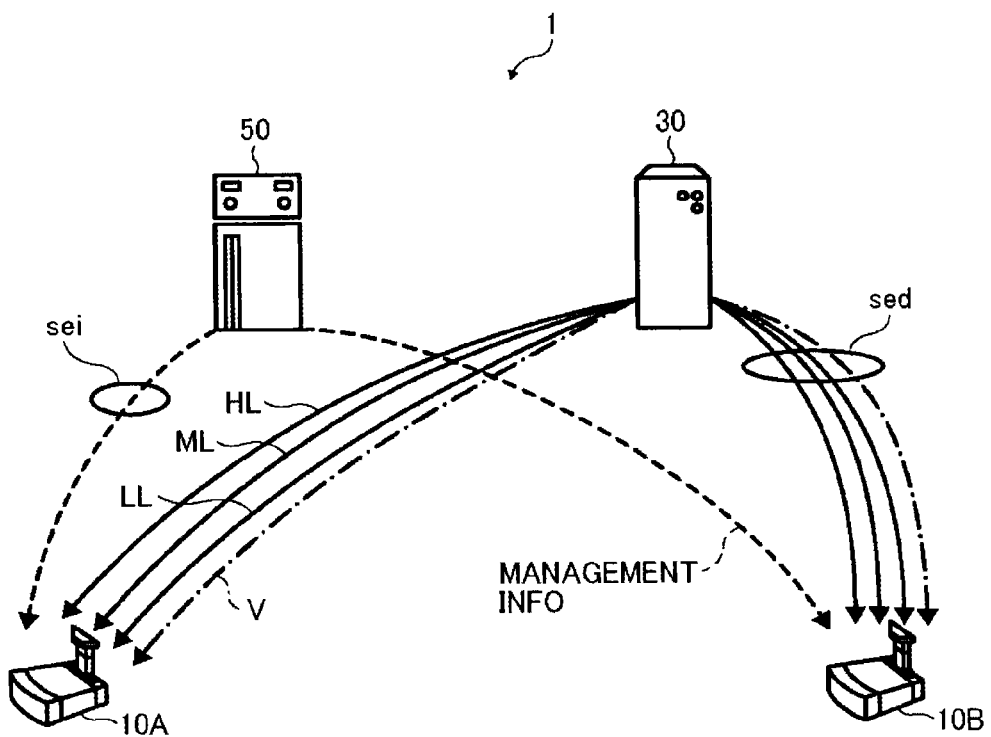
FIG. 2 is an illustration for explaining various data such as image data, sound data, and various management information, transmitted or received in the transmission system of FIG. 1, according to an example embodiment of the present invention.
Figure 3A:
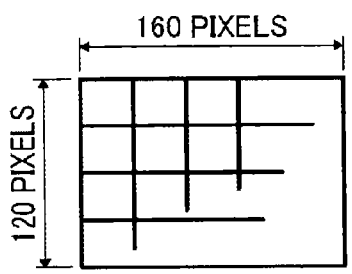
FIGS. 3A to 3C are an illustration for explaining quality of image data.
Figure 3B:
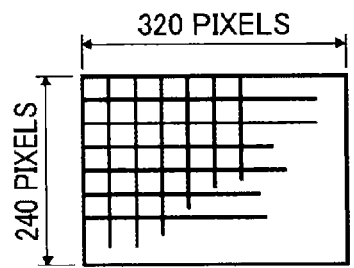
Figure 3C:
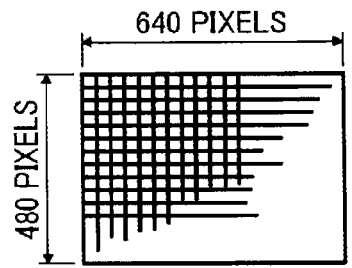

FIG. 1 is a schematic block diagram illustrating a configuration of the transmission system 1. FIG. 2 is a conceptual diagram illustrating a transmission/reception of image data, sound data, and various types of management information in the transmission system of FIG. 1. FIGS. 3A to 3C are conceptual diagrams explaining the image quality of image data.

The transmission system 1 illustrated in FIG. 1 includes a plurality of transmission terminals (10*aa*, 10*ab*, . . . ), displays (120*aa*, 120*ab*, . . . ) for the respective transmission terminals (10*aa*, 10*ab*, . . . ), a plurality of administrator terminals (20*a*, 20*b*, 20*c*, and 20*d*), a plurality of relay devices (30*a*, 30*b*, 30*c*, and 30*d*), a transmission management system 40, a program providing system 90, and a maintenance system 100. Further, the transmission management system 40 includes a terminal management system 50 and a counterpart registration system 80.

The plurality of transmission terminals 10 each transmit and receive image data and sound data serving as examples of contents data. Note that another example of contents data includes text data. In other words, it is sufficient for contents data to include at least one of image data, sound data, and text data.

Hereinafter, an arbitrary one or ones of the plurality of transmission terminals (10*aa*, 10*ab*, . . . ) is/are represented as a "transmission terminal(s) 10", an arbitrary one or ones of the plurality of displays (120*aa*, 120*ab*, . . . ) is/are represented as a "display(s) 120", and an arbitrary one or ones of the plurality of relay devices (30*a*, 30*b*, 30*c*, and 30*d*) is/are represented as a "relay device(s) 30".

In this example, a transmission terminal 10 serving as a request sender that gives a request to start a videoconference is represented as a "starting terminal", and a transmission terminal 10 serving as a counterpart terminal (relay destination) that is a request destination is represented as a "counterpart terminal".

As illustrated in FIG. 2, a management information session sei for transmitting and receiving various types of management information is established via the terminal management system 50 between a starting terminal 10A and a counterpart terminal 10B in the transmission system 1. In addition, four sessions for transmitting and receiving four items of data, namely, high-resolution image data (HL), intermediate-resolution image data (ML), low-resolution image data (LL), and sound data (V), are established via a relay device 30 between the starting terminal 10A and the counterpart terminal 10B. Here, these four sessions are collectively indicated as an image/sound data session sed. Note that it is not always necessary to have the relay device 30 to relay data between the starting terminal 10A and the counterpart terminal 10B; the image/sound data session sed may be established directly between the starting terminal 10A and the counterpart terminal 10B.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of communicating via a narrow band, low-quality image data that only includes low-resolution image data serving as a base image is relayed. In the case of communicating via a relatively wide band, intermediate-quality image data including low-resolution image data serving as a base image and intermediate-resolution image data is relayed. In the case of communicating via a very wide band, high-quality image data including low-resolution image data serving as a base image, intermediate-resolution image data, and high-resolution image data is relayed.

The relay devices 30 illustrated in FIG. 1 relay contents data between the plurality of transmission terminals 10. The terminal management system 50 centrally manages login authentication from the transmission terminals 10, the communication states of the transmission terminals 10, candidate lists of the transmission terminals 10, and the communication states of the relay devices 30, etc. Note that an image of image data may be a moving image or a still image, or may include both thereof.

A plurality of routers (70a, 70b, 70c, 70d, 70ab, and 70cd) select an optimal path for contents data such as image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a transmission terminal program for causing a transmission terminal 10 to realize various functions (or for causing a transmission terminal 10 to function as various elements). For example, the transmission terminal program may be transmitted to the transmission terminal 10 to be downloaded onto the transmission terminal 10. The HD 204 of the program providing system 90 further stores a relay device program for causing a relay device 30 to realize various functions (or for causing a relay device 30 to function as various elements). For example, the relay device program may be transmitted to the relay device 30 to be downloaded onto the relay device 30.

Further, the HD 204 of the program providing system 90 stores a transmission management program for causing the terminal management system 50 to realize various functions (or for causing the terminal management system 50 to function as various elements). For example, the transmission management program may be transmitted to the terminal management system 50 to be downloaded onto the terminal management system 50. In addition, the HD 204 of the program providing system 90 stores a counterpart registration program for causing the counterpart registration system 80 to realize various functions (or for causing the counterpart registration system 80 to function as various elements). For example, the counterpart registration program may be transmitted to the counterpart registration system 80 to be downloaded onto the counterpart registration system 80. Note that the terminal management program and the counterpart registration program may be collectively referred to as a transmission management program.

In this example, the maintenance system 100 is implemented by one or more computers for performing maintenance, management, or conservation of at least one of the transmission terminals 10, the relay devices 30, the terminal management system 50, the counterpart registration system 80, and the program providing system 90. For example, in the case where the maintenance system 100 is located in one country, and the transmission terminals 10, the relay devices 30, the terminal management system 50, the counterpart registration system 80, or the program providing system 90 is/are located outside that country, the maintenance system 100 remotely performs, via a communication network 2, maintenance, management, or conservation of at least one of the transmission terminals 10, the relay devices 30, the terminal management system 50, the counterpart registration system 80, and the program providing system 90. The maintenance system 100 may perform maintenance such as management of the model number, serial number, sales contact, maintenance checkup, or a past history of failures of at least one of the transmission terminals 10, the relay devices 30, the terminal management system 50, the counterpart registration system 80, and the program providing system 90.

In this example, the transmission terminals (10aa, 10ab, 10ac, . . . ), the relay device 30a, and the router 70a are connected to be communicable with each other by a local area network (LAN) 2a. The transmission terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are provided in a certain area A. For example, assuming that the area A is an office in Tokyo, the LAN 2a is managed in the first sales division, and the LAN 2b is managed in the second sales division.

Further, in this example, transmission terminals (10ca, 10cb, 10cc, . . . ), the relay device 30c, and the router 70c are connected to be communicable with each other by a LAN 2c. The transmission terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are provided in a certain area B. For example, assuming that the area B is an office in Osaka, the LAN 2c is managed in the first development division, and the LAN 2d is managed in the second development division. The area A and the area B are connected to be communicable with each other from the routers (70ab and 70cd), respectively, via the Internet 2i.

The terminal management system 50, the counterpart registration system 80, and the program providing system 90 are connected to be communicable with the transmission terminals 10 and the relay devices 30 via the Internet 2i. The terminal management system 50, the counterpart registration system 80, and the program providing system 90 may be located in the area A or the area B, or may be located in other areas.

The communication network 2 of this embodiment includes the LAN 2a, the LAN 2b, the dedicated line 2ab, the Internet 2i, the dedicated line 2cd, the LAN 2c, and the LAN 2d. The communication network 2 may include not only a wired network, but also a network where communication is performed wirelessly, such as Wireless Fidelity (WiFi) or Bluetooth (registered trademark).

In FIG. 1, four digits indicated below each of the transmission terminals 10, each of the relay devices 30, the terminal management system 50, each of the routers 70, the counterpart registration system 80, and the program providing system 90 indicates an IP address in an abbreviated form in the general Internet Protocol version 4 (IPv4). For example, the IP address of the transmission terminal 10aa is "1.2.1.3". Although IPv6 may be used instead of IPv4, IPv4 is used in order to make the description simple.

Note that the transmission terminals 10 may be used not only for communication between offices or between different rooms in the same office, but also for communication within the same room or for outdoor-indoor communication or outdoor-outdoor communication. In the case where the transmission terminals 10 are used outside, wireless communication using a cellular phone communication network or the like is performed.

<Hardware Configuration of Transmission System>

Figure 4:
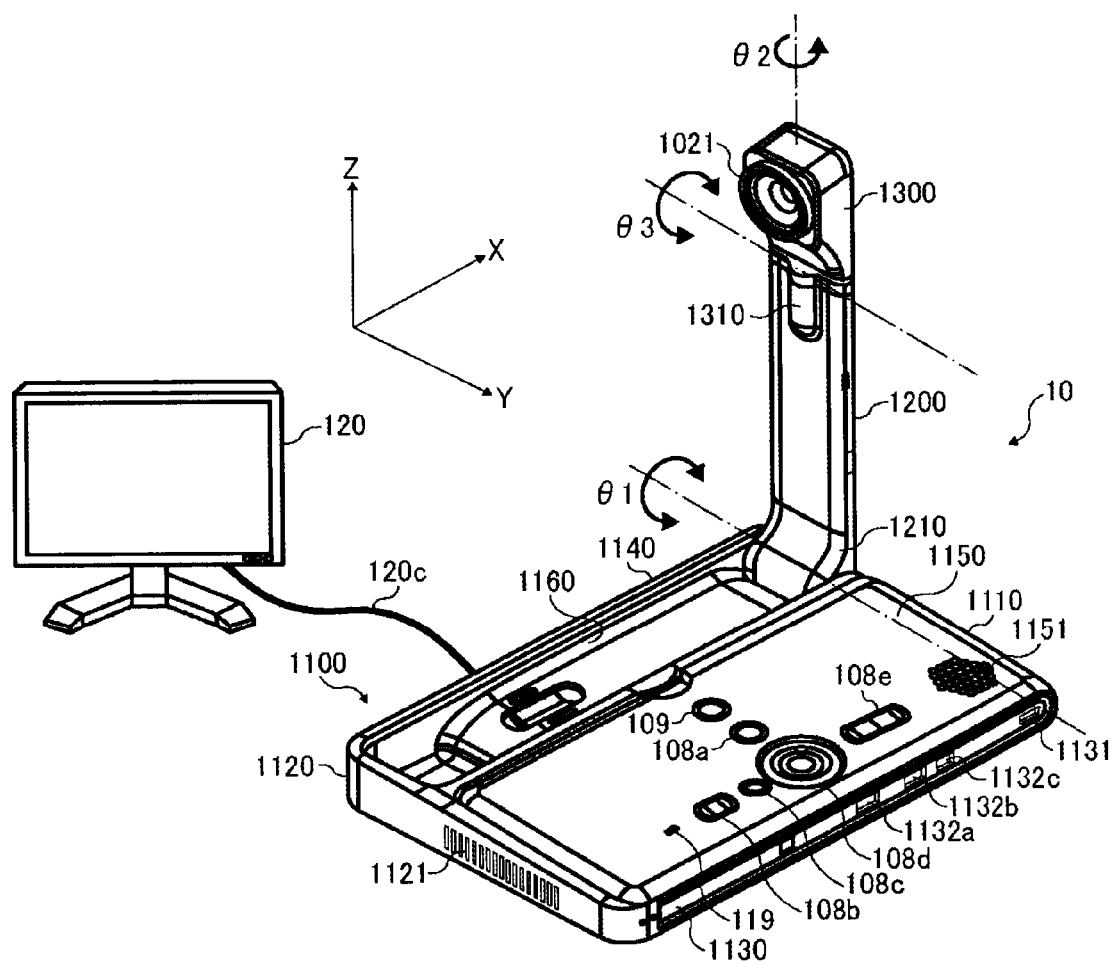
FIG. 4 is an external view of a transmission terminal of the transmission system of FIG. 1.

Next, referring to FIGS. 4 to 6, the hardware configuration of the transmission system 1 of this embodiment will be described. FIG. 4 is an external view of the transmission terminal 10. The description will be given assuming that the longitudinal direction of the transmission terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the transmission terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the transmission terminal 10 can be taken in via the inlet face and exhausted to the rear of the transmission terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e), a power switch 109, and an alarm lamp 119, which are formed thereon. In addition, the operation panel 1150 has a sound output face 1151, which is formed of a plurality of sound output holes for allowing output sound from a built-in speaker 115 to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 are provided on the right-side wall 1130 of the casing 1100. A connection port for electrically connecting a cable 120c for a display 120 to the external device connection I/F 118 is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 and is rotatable in the vertical direction within the range of a tilt angle θ1 of 135 degrees with respect to the casing 1100. FIG. 4 indicates a state in which the tilt angle θ1 is 90 degrees.

The camera housing 1300 has a built-in camera 112 provided thereon, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is rotatable in the vertical and horizontal directions within a range of a pan angle θ2 of ±180 degrees and a tilt angle θ3 of ±45 degrees with respect to the arm 1200, in which the state illustrated in FIG. 4 serves as 0 degrees.

Since the relay devices 30, the terminal management system 50, the counterpart registration system 80, the program providing system 90, and the maintenance system 100 each have the same appearance as that of a general server computer, descriptions of the outer appearances thereof are omitted.

Figure 5:
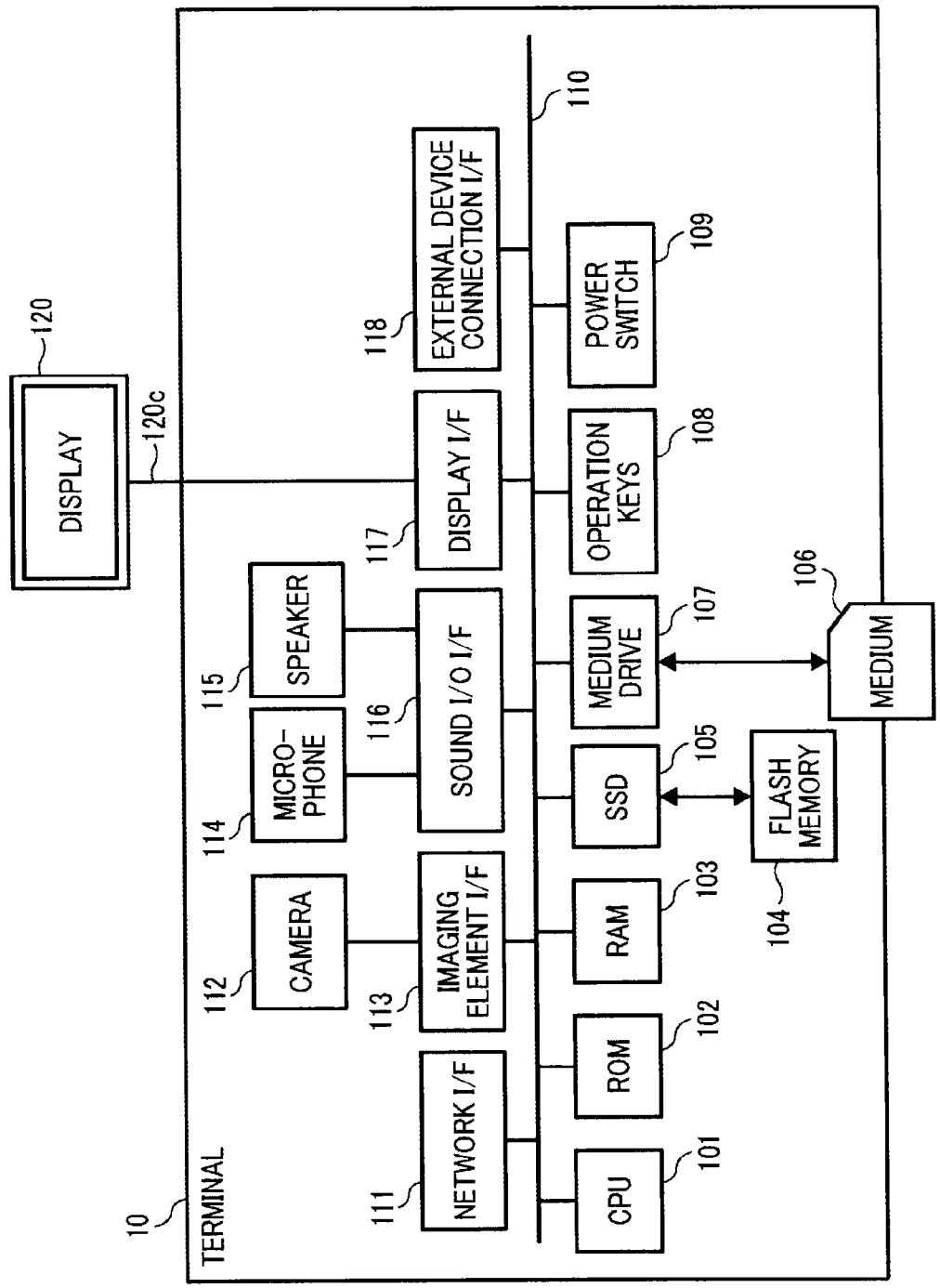
FIG. 5 is a hardware configuration diagram of the transmission terminal of FIG. 4.

FIG. 5 is a hardware configuration diagram of the transmission terminal 10. As illustrated in FIG. 5, the transmission terminal 10 of the embodiment includes a central processing unit (CPU) 101 that controls entire operation of the transmission terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the transmission terminal program, image data, and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal for the transmission terminal 10, the power switch 109 for turning ON/OFF the power of the transmission terminal 10, and a network interface (I/F) 111 for transmitting data using the communication network 2.

In addition, the transmission terminal 10 includes: the built-in camera 112, which captures an image of a subject and obtains image data under control of the CPU 101; an imaging element I/F 113 that controls driving of the camera 112; the built-in microphone 114, which receives an audio input; the built-in speaker 115, which outputs sound; a sound input/output I/F 116 that processes inputting/outputting of a sound signal between the microphone 114 and the speaker 115 under control of the CPU 101; a display I/F 117 that transmits image data to an external display 120 under control of the CPU 101; the external device connection I/F 118 connected to a connection port 1021g illustrated in FIG. 4 in order to connect various external devices; the alarm lamp 119, which indicates an abnormality of various functions of the transmission terminal 10; and a bus line 110 such as an address bus and a data bus for electrically connecting the above-described elements as illustrated in FIG. 5.

The display 120 may be implemented by a liquid crystal display or organic electroluminescence (EL) display, which displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens system, and a solid-state imaging element that photo-electrically converts an image of a subject to electronic data. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the camera 112, the microphone 114, and the speaker 115 need not necessarily be included in the transmission terminal 10, and the transmission terminal 10 may be connected to only an external camera, an external microphone, and an external speaker. In addition, the recording medium 106 is removable from the transmission terminal 10. In addition, a non-volatile memory that reads or writes data under control of the CPU 101 is not limited to the flash memory 104, and an electrically erasable and programmable read-only memory (EEPROM) may be used instead.

Further, the transmission terminal program may be stored in a file in an installable format or an executable format on a computer-readable recording medium such as the recording medium 106 for distribution. In addition, the transmission terminal program may be stored on the ROM 102, instead of the flash memory 104.

Figure 6:
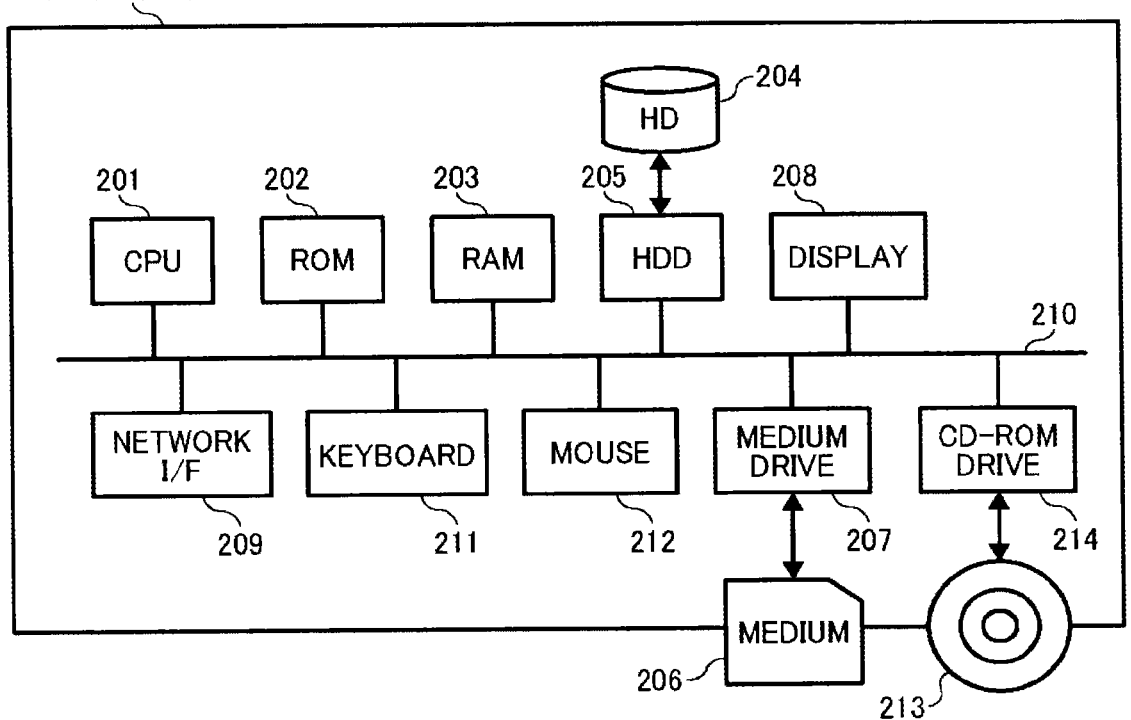
FIG. 6 is a hardware configuration diagram of a relay device, a terminal management system, a counterpart registration system, a program providing system, and a maintenance system of the transmission system of FIG. 1.

FIG. 6 is a hardware configuration diagram of any one of the relay device 30, the terminal management system 50, the counterpart registration system 80, the program providing system 90, and the maintenance system 100. For simplicity, the case for the terminal management system 50 is described below.

The terminal management system 50 includes a CPU 201 that controls entire operation of the terminal management system 50, a ROM 202 that stores a program used for controlling the CPU 201, such as an IPL, a RAM 203 used as a work area for the CPU 201, the HD 204 that stores various types of data such as the terminal management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Note that the terminal management program may be stored in a file in an installable format or an executable format on a computer-readable recording medium such as the recording medium 206 or the CD-ROM 213 and distributed. In addition, the terminal management program may be stored on any desired memory such as the ROM 202, instead of the HD 204.

In addition, since the relay devices 30 have a hardware configuration that is the same as or similar to that of the above-described terminal management system 50, a description thereof is omitted. Note that the HD 204 stores a relay device program for controlling the relay devices 30. Also in this case, the relay device program may be stored in a file in an installable format or an executable format on a computer-readable recording medium such as the recording medium 206 or the CD-ROM 213 and distributed. In addition, the relay device program may be stored on any desired memory such as the ROM 202, instead of the HD 204.

Further, since the counterpart registration system 80 has a hardware configuration that is the same as or similar to that of the above-described terminal management system 50, a description thereof is omitted. Note that the HD 204 stores a counterpart registration program for controlling the counterpart registration system 80. Also in this case, the counterpart registration program may be stored in a file in an installable format or an executable format on a computer-readable recording medium such as the recording medium 206 or the CD-ROM 213 and distributed. In addition, the counterpart registration program may be stored on any desired memory such as the ROM 202, instead of the HD 204.

In addition, since the program providing system 90 and the maintenance system 100 each have a hardware configuration that is the same as or similar to that of the above-described terminal management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on any desired memory such as the ROM 202, instead of the HD 204. In addition, the same applies to the maintenance system 100 and a maintenance program.

Note that each of the above-described programs may be stored on a computer-readable recording medium such as a compact disc recordable (CD-R), a digital versatile disc (DVD), or a Blue-ray disc, which serve as other examples of the above-described removable recording medium, and may be provided.

<Functional Configuration of Transmission System>

Figure 7:
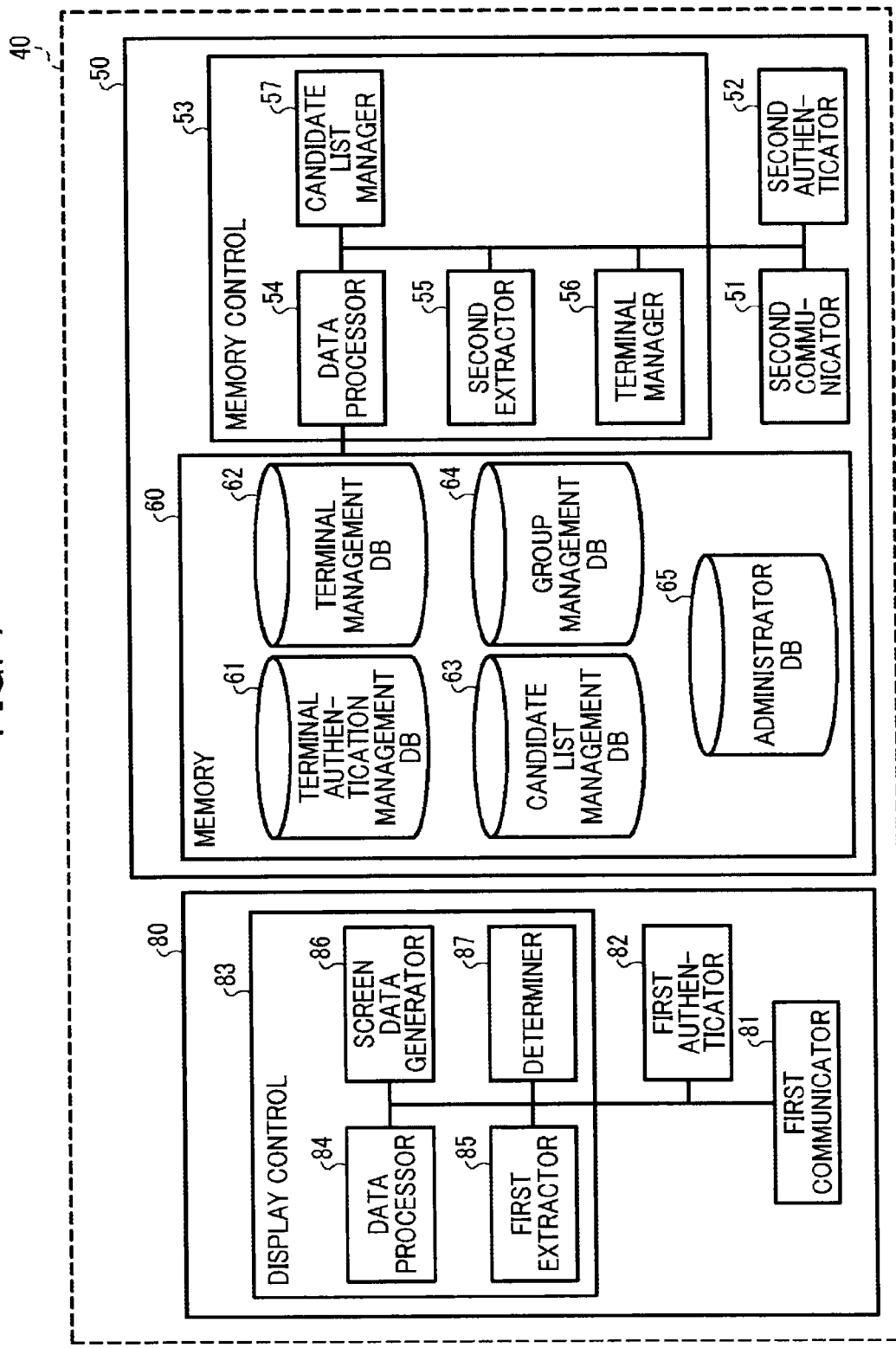
FIG. 7 is a functional block diagram of the terminal management system and the counterpart registration system included in the transmission management system of FIG. 1.

Referring to FIGS. 7 to 12, a functional configuration of the terminal management system 50 and the counterpart registration system 80 is explained, according to an example embodiment of the present invention. FIG. 7 is a schematic block diagram illustrating a functional structure of the terminal management system 50 and the counterpart registration system 80 of the transmission management system 40.

(Functional Structure of Terminal Management System)

With the hardware structure of FIG. 6 that operates in cooperation with the terminal management program, the terminal management system 50 includes a second communicator 51, a second authenticator 52, a memory control 53, and a memory 60. The memory control 53 includes a data processor 54, a second extractor 55, a terminal manager 56, and a candidate list manager 57. The memory 60 includes a terminal authentication management DB 61, a terminal management DB 62, a candidate list management DB 63, a group management DB 64, and an administrator DB 65.

In this example, data stored in the group management DB 64 and the administrator DB 65 are one example of first association information. The data stored in the candidate list management DB 63 is one example of second association information. The group management DB 64 is one example of third association information, of the first association information. The administrator DB 65 is one example of fourth association information, of the first association information.

FIG. 8 is a conceptual diagram of the terminal authentication management DB 61. The terminal authentication management DB 61 stores a terminal ID and a password in association with each other, as association information. The terminal ID is identification information for identifying a transmission terminal 10. The terminal ID (an example of terminal identification information) may be identification information previously stored in a memory of the transmission terminal 10, or may be identification information input by the user of the transmission terminal 10 to the transmission terminal 10. The password is a password for the transmission terminal 10 to log in to the transmission management system 40 with the terminal ID. Note that records in the terminal authentication management DB 61 may have columns (fields) other than those described above.

FIG. 9 is a conceptual diagram of the terminal management DB 62. The terminal management DB 62 stores a terminal ID, name, operation state, date/time received, and IP address of a terminal as items of association information that are associated with one another. The terminal ID is identification information for identifying a transmission terminal 10. The name is the name of the transmission terminal 10. Alternatively, the name may be the name of the user of the transmission terminal 10, the name of a department to which the user belongs, or the like. The operation state is the most recently obtained operation state of the transmission terminal 10. The date/time received is the date and time at which a login request from the transmission terminal 10 to the transmission management system 40 has been accepted. The IP address is the IP address of the transmission terminal 10. Note that records in the terminal management DB 62 may have columns other than those described above.

FIG. 10 is a conceptual diagram of the candidate list management DB 63. The candidate list management DB 63 manages the terminal ID of a starting terminal and the terminal ID of a candidate counterpart terminal that may be requested by the starting terminal to have communication with, as items of association information that are associated with each other. Note that records in the candidate list management DB 63 may have columns other than those described above.

FIG. 11 is a conceptual diagram of the group management DB 64. The group management DB 64 stores a group ID, group name, and terminal ID for identifying a transmission terminal belonging to that group, in association with one another, as association information. The group ID is an example of identification information for identifying a group. The records in the group management DB 64 may have columns (fields) other than those described above.

FIG. 12 is a conceptual diagram of the administrator DB 65. The administrator DB 65 manages an administrator ID, password, and a group ID for identifying a group being managed by the administrator, in association with one another, as association information. The table of FIG. 12 indicates that, the administrator A having the administrator ID "02A" manages the group G1 having the group ID "G001" and the group G2 having the group ID "G002". The administrator B having the administrator ID "02B" manages the group G3 having the group ID "G003". The administrator C having the administrator ID "02C" manages the group G4 having the group ID "G004". The records in the administrator DB 65 may have columns (fields) other than those described above.

The administrator ID is one example of identification information for identifying the administrator of the transmission terminal 10. The administrator ID may be replaced by a name of the administrator. The password is used for logging into the management system 40 with a specific administrator ID.

Referring back to FIG. 7, the second communicator 51 communicates with the transmission terminal 10 or the other system, through the communication network 2.

The second authenticator 52 authenticates a transmission terminal 10, which logs in the terminal management system 50 (transmission management system 40) to start communication with the counterpart transmission terminal 10. More specifically, the second authenticator 52 searches the terminal authentication management DB 61 in the memory 60, using a terminal D and a password included in login information received at the second communicator 51 as search keys. The second authenticator 52 determines whether the search keys match a terminal ID and a password in the terminal authentication management DB 61, to determine whether to allow login to the terminal management system 50.

The terminal manager 56 manages the operation state of the transmission terminal 10, which requests for logging into the transmission management system 40. The terminal manager 56 updates a record in the terminal management DB 62 that corresponds to the terminal ID of the transmission terminal 10, which has given the login request to the terminal management system 50 (the transmission management system 40). Specifically, in the case of successful login, the "operation state" is changed from offline to online (communication OK), and the "date/time received" and the "IP address" are updated.

The second extractor 55 searches the candidate list management DB 63 by using, for example, the terminal ID of the transmission terminal 10, which has given the login request to the terminal management system 50 (the transmission management system 40), as a search key, and reads a terminal ID registered as a candidate counterpart terminal for the transmission terminal 10, which has given the login request. In addition, the second extractor 55 searches the terminal management DB 62 by using the extracted terminal ID as a search key, and reads the operation state of a transmission terminal 10 for every extracted terminal ID. The read terminal ID and the operation state are transmitted to the transmission terminal 10, which has given the login request to the transmission management system 40, via the second communicator 51. With this process, a candidate list including a candidate counterpart terminal(s) is displayed on the display 120 of the transmission terminal 10, which has given the request. The user of the transmission terminal 10 selects a desired counterpart terminal from the candidate list, thereby establishing a session sed between the transmission terminals 10 and realizing communication between the transmission terminals 10.

Note that the session sed between the transmission terminals 10 may be established via the transmission management system 40 or may directly be established. In addition, the transmission terminals 10 can exchange contents data through the session sed.

The second extractor 55 can also search the candidate list management DB 63 by using the terminal ID of the transmission terminal 10, which has given the login request to the transmission management system 40, as a search key, and extract the terminal ID of a starting terminal from a record in which the terminal ID of the transmission terminal 10, which has given the login request, is registered as the terminal ID of a candidate counterpart terminal. Accordingly, the second extractor 55 searches the terminal management DB 62 by using, as a search key, the terminal ID of a starting terminal that registers the transmission terminal 10, which has given the login request, as a candidate counterpart terminal, thereby extracting a corresponding operation state.

The candidate list manager 57 adds, changes, or deletes a record to/in/from the candidate list management DB 63.

The data processor 54 performs processing to store data in the memory 60. In addition, the data processor 54 performs processing to read data stored in the memory 60.

(Functional Configuration of Counterpart Registration System)

Next, the counterpart registration system 80 will be described. With the hardware configuration illustrated in FIG. 6 that operates in cooperation with the counterpart registration program, the counterpart registration system 80 includes a first communicator 81, a first authenticator 82, and a display control 83. Further, the display control 83 includes a data processor 84, a first extractor 85, a screen data generator 86, and a determiner 87.

Among these elements, the first communicator 81, the data processor 84, and the first extractor 85 have functions that are the same as or similar to those of the second communicator 51, the data processor 54, and the second extractor 55, respectively, and hence descriptions thereof are omitted. Although the counterpart registration system 80 has no memory in this embodiment, the data processor 84 and the first extractor 85 can realize the same functions as those of the data processor 54 and the second extractor 55 by accessing the memory 60 of the terminal management system 50 via the communication network 2.

The first authenticator 82 authenticates a transmission terminal 10 or an administrator terminal 20 when the transmission terminal 10 or the administrator terminal 20 tries to log in to the counterpart registration system 80 (transmission management system 40) in order to add or delete a candidate counterpart terminal. Specifically, a request to add or delete a candidate counterpart terminal can be given not only from the transmission terminal 10, but also from the administrator terminal 20.

In addition, the first authenticator 82 searches the terminal authentication management DB 61 (or the administrator DB 65) of the memory 60 by using a terminal ID (or an administrator ID) and a password included in login information received by the first communicator 81 as search keys. The first authenticator 82 determines whether the search keys match information in the terminal authentication management DB 61 (or the administrator DB 65), thereby authenticating whether to permit login to the counterpart registration system 80 (transmission management system 40).

The screen data generator 86 generates various screens, such as an authentication screen (see FIG. 17), an administrator registration screen (see FIG. 18), a management terminal list screen (see FIG. 19), a management terminal registration screen (see FIG. 21), and a confirmation screen (see FIGS. 22 and 23). The screen data generator 86 generates a screen in, for example, HyperText Markup Language (HTML).

The data processor 84 performs operation as described below. In this example, the terminal ID of the management terminal is one example of identification information for identifying the management terminal. The terminal ID of the starting terminal is one example of identification information for identifying the starting terminal. The terminal ID of the candidate counterpart terminal is one example of identification information for identifying the candidate counterpart terminal. For example, the identification information may include not only the terminal ID, but also the terminal name, and a manufacturing number of the terminal.

In one example, the data processor 84 performs the function of registering a management terminal. For example, in response to a request for registering a specific terminal as a management terminal that is received at the first communicator 81, the data processor 84 stores a terminal ID of the specific terminal, in association with a specific administrator ID, to register the specific terminal as a management terminal to be managed by the administrator identified by the specific administrator ID. More specifically, the first association information associating one or more management terminals and the administrator, which may be managed using the group management DB 64 and the administrator DB 65, is updated to include the specific terminal as the management terminal for the specific administrator that sends the request.

The data processor 84 further performs the function of registering a candidate counterpart terminal, respectively, for the newly registered management terminal and the previously registered management terminal. For example, the data processor 84 extracts the terminal ID of each of one or more management terminals other than the specific management terminal just registered ("the newly registered management terminal"), from the first association information for the specific administrator. The data processor 84 further registers the terminal ID of the newly registered management terminal, as a candidate counterpart terminal for each one of the other management terminals of the specific administrator, by storing the terminal ID of the newly registered management terminal in association with the extracted terminal ID of each one of the other management terminals, which is a starting terminal ID, in the second association information. For example, the second association information may be managed using the candidate list management DB 63. The data processor 84 further associates the extracted terminal ID of each one of the other management terminals, with the terminal ID of the newly registered management terminal, which is a starting terminal ID, in the second association information, to register each one of the other management terminals as a candidate counterpart terminal for the newly registered management terminal.

In another example, the data processor 84 performs the function of deleting a management terminal. For example, in response to a request for deleting a specific management terminal from being under management of the specific administrator, received at the first communicator 81, the data processor 84 deletes a terminal ID of the specific management terminal, which is stored in association with a specific administrator ID of the specific administrator in the first association information, to delete the specific management terminal from the management terminals being managed by the specific administrator.

The data processor 84 further performs the function of deleting a candidate counterpart terminal, respectively, for the deleted management terminal and the registered management terminal. For example, the data processor 84 extracts the terminal ID of each one or more management terminals other than the specific management terminal being just deleted ("the deleted management terminal"), from the first association information for the specific administrator. The data processor 84 further deletes the terminal ID of the deleted management terminal, which is stored as a candidate counterpart terminal for each one of the other management terminals of the specific administrator, by deleting the terminal ID of the deleted management terminal that is stored in association with the terminal ID of the other management terminal that is a starting terminal ID, in the second association information. The data processor 84 further deletes the terminal ID of the terminal ID of each one of the other management terminals, which is stored as a candidate counterpart terminal for the deleted management terminal that is a starting terminal ID, in the second association information.

Figure 13:
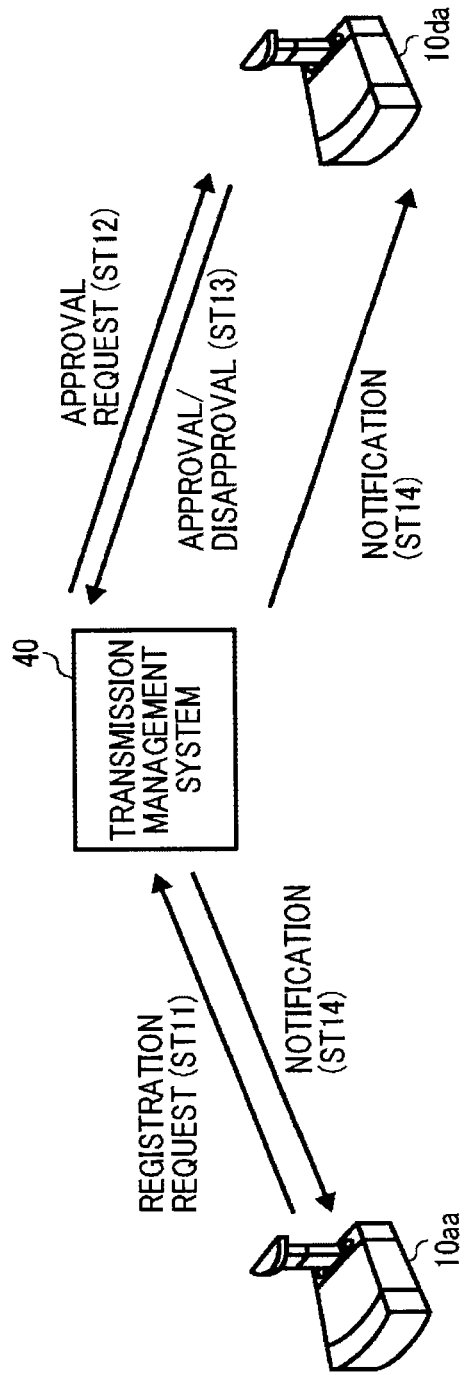
FIG. 13 is a conceptual diagram illustrating an example of a candidate counterpart terminal registration process.
Figure 14:
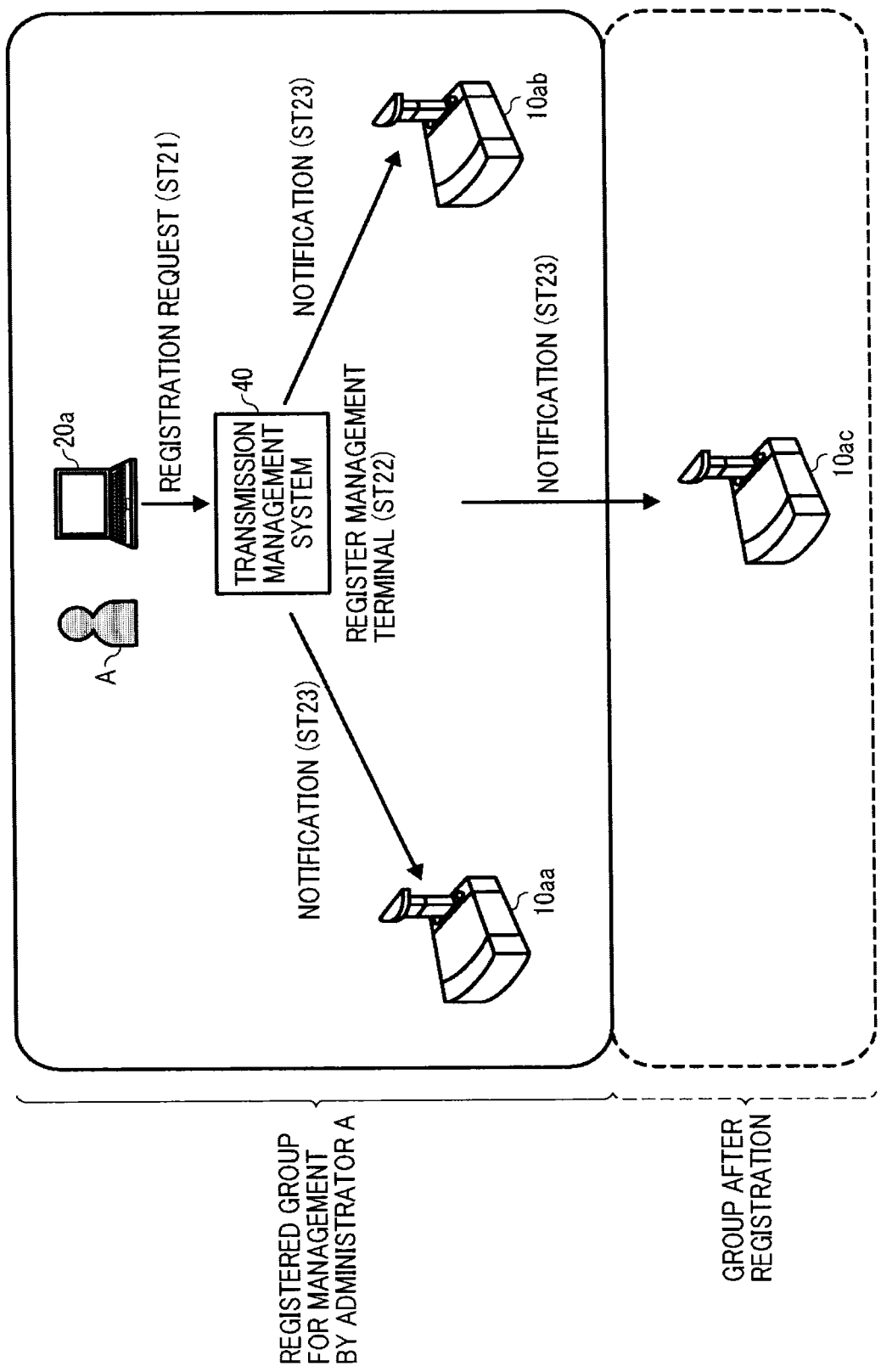
FIG. 14 is a conceptual diagram illustrating an example of a candidate counterpart terminal registration process.
Figure 15:
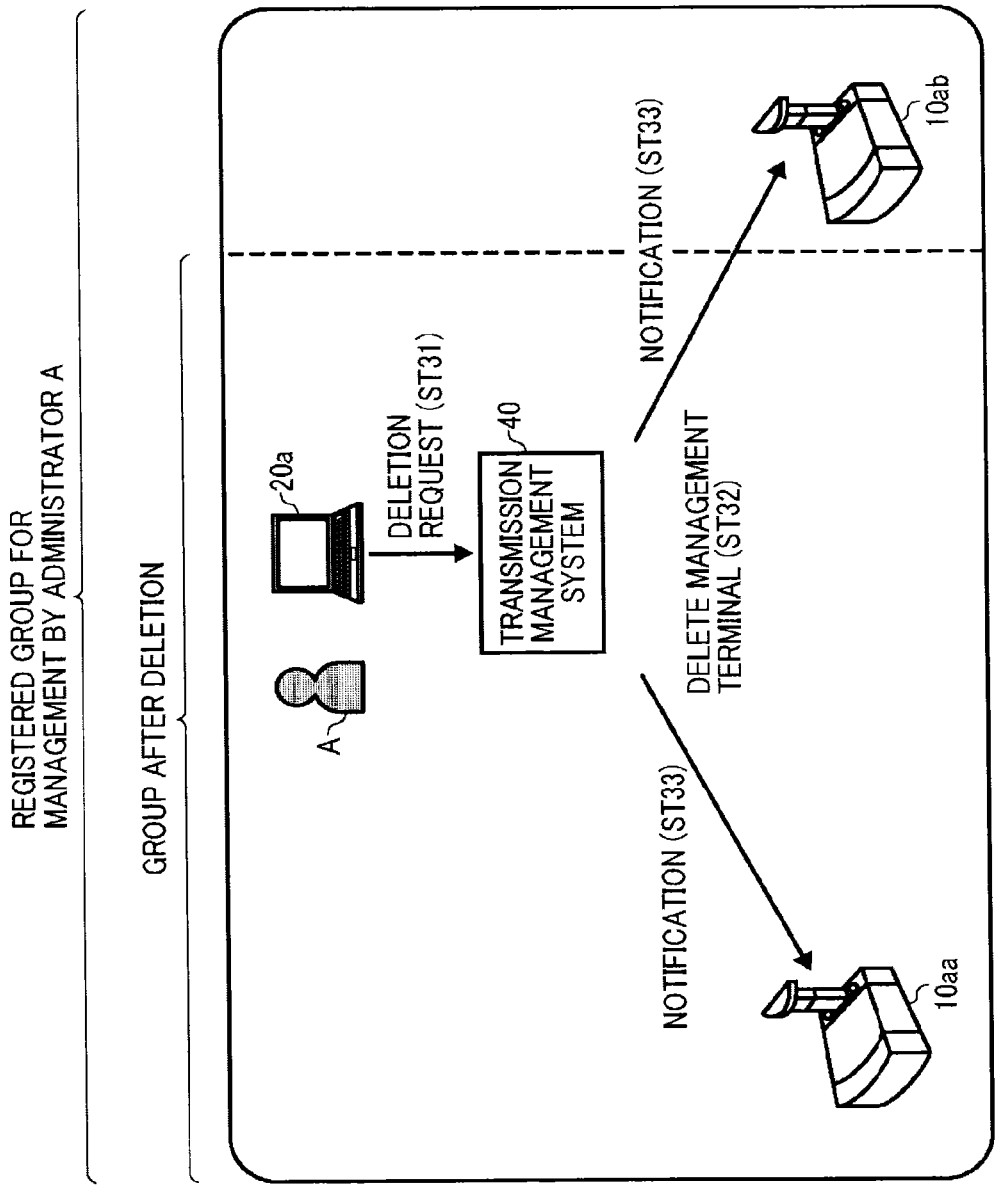
FIG. 15 is a conceptual diagram illustrating an example of a candidate counterpart terminal deletion process.

Referring now to FIGS. 13 and 14, example operation of registering a candidate counterpart terminal to the candidate list is explained. Referring to FIG. 15, example operation of deleting a candidate counterpart terminal from the candidate list is explained.

(First Scenario)

FIG. 13 is a conceptual diagram illustrating example operation of registering a candidate counterpart terminal, in case of a first scenario. In this example scenario illustrated in FIG. 13, it is assumed that the user at the transmission terminal 10aa requests to register the transmission terminal 10da, which belongs to a different group, as a candidate counterpart terminal in the candidate list for the terminal 10aa.

At ST11, the transmission terminal 10aa sends a request for registering the transmission terminal 10da, as a candidate counterpart terminal for the terminal 10aa, to the transmission management system 40.

At ST12, the transmission management system 40 sends a request for approval to register the terminal 10da as a candidate counterpart terminal for the terminal 10aa, to the terminal 10da.

At ST13, the transmission terminal 10da sends a response indicating whether to approve or disapprove registration, to the transmission management system 40.

Assuming that the response indicates approval, the transmission management system 40 registers the transmission terminal 10da, as a candidate counterpart terminal for the transmission terminal 10aa, in the candidate list management DB 63. At S14, the transmission management system 40 sends notification indicating completion of registration to the transmission terminal 10aa and the transmission terminal 10da, respectively.

(Second Scenario)

FIG. 14 is a conceptual diagram illustrating example operation of registering a candidate counterpart terminal, in case of a second scenario. In this example scenario illustrated in FIG. 14, when the transmission terminals 10aa and 10ab are already registered as a management terminal of the group G1 being managed by the administrator A, the transmission management system 40 newly registers the transmission terminal 10ac, as a management terminal of the group G1, and further performs the process of registering the newly registered terminal 10ac as a candidate counterpart terminal.

At ST21, the administrator terminal 20a sends a request for registering the transmission terminal 10ac, as a management terminal of the group G1 (group ID "G001") being managed by the administrator A, to the transmission management system 40.

At ST22, the transmission management system 40 registers the transmission terminal 10ac as a management terminal of the group G1, and performs the process of registering candidate counterpart terminals respectively for the newly registered terminal 10ac and previously registered terminals 10 in the group G1. In this registration process, the transmission management system 40 registers the newly registered transmission terminal 10ac, as a candidate counterpart terminal for each one of the terminals 10aa and 10ab of the same group G1, in the candidate list management DB 63. Further, in the registration process, the transmission management system 40 registers the transmission terminals 10aa and 10ab, which are already registered, as a candidate counterpart terminal for the newly registered terminal 10ac of the same group G1, in the candidate list management DB 63. Through this registration process, which is automatically performed with registration of the transmission terminal 10ac as a management terminal of the administrator A, the administrator A or the user of each terminal 10 does not have to instruct registration of the newly registered terminal 10ac as a candidate counterpart terminal or registration of the previously registered terminals 10aa and 10ab as a candidate counterpart terminal. In other words, with a request for registering the terminal as a management terminal, which is made by the administrator A, registration of candidate counterpart terminals will be automatically performed by the transmission management system 40, collectively, for each one of the terminals in that group.

At ST23, the transmission management system 40 sends notification indicating that the transmission terminal 10ac is newly registered to the group G1, respectively, to the transmission terminals 10aa, 10ab, and 10ac. The transmission management system 40 further sends notification indicating completion of registration of candidate counterpart terminals, respectively, to the transmission terminals 10aa, 10ab, and 10ac.

(Third Scenario)

FIG. 15 is a conceptual diagram illustrating example operation of deleting a candidate counterpart terminal, in case of a third scenario. In this example scenario illustrated in FIG. 15, when the transmission terminals 10aa and 10ab are already registered as a management terminal of the group G1 being managed by the administrator A, the transmission management system 40 deletes the transmission terminal 10ab from the management terminal of the group G1, and further performs the process of deleting a candidate counterpart terminal, respectively, for the deleted transmission terminal 10ab and the registered terminal 10aa.

At ST31, the administrator terminal 20a sends a request for deleting the transmission terminal 10ab, which is a management terminal, from the group G1 (group ID "G001") being managed by the administrator A.

At ST32, the transmission management system 40 deletes the transmission terminal 10ab from the management terminals of the group G1, and further performs the process of deleting the candidate counterpart terminals, respectively, for the terminal 10aa and 10ab. In this deletion process, the transmission management system 40 deletes the deleted transmission terminal 10ab, from the candidate counterpart terminals for the transmission terminal 10aa of the same group G1. Further, in the deletion process, the transmission management system 40 deletes the transmission terminal 10aa, from the candidate counterpart terminals for the transmission terminal 10ab of the same group G1. Through this deletion process, which is automatically performed with deletion of the transmission terminal 10ab from the management terminals of the administrator A, the administrator A or the user of each terminal 10 does not have to instruct deletion of the deleted transmission terminal 10ab from the candidate counterpart terminals or deletion of the transmission terminal 10aa from the candidate counterpart terminals. In other words, with a request for deleting the terminal from the management terminals, which is made by the administrator A, the deletion process will be automatically performed by the transmission management system 40, collectively, for each one of the terminals in the group.

At ST33, the transmission management system 40 sends notification indicating that the transmission terminal 10ab is deleted from the group G1, respectively, to the transmission terminals 10aa and 10ab. The transmission management system 40 further sends notification indicating completion of deletion of candidate counterpart terminals, respectively, to the transmission terminals 10aa and 10ab.

Example Operation

Figure 16:
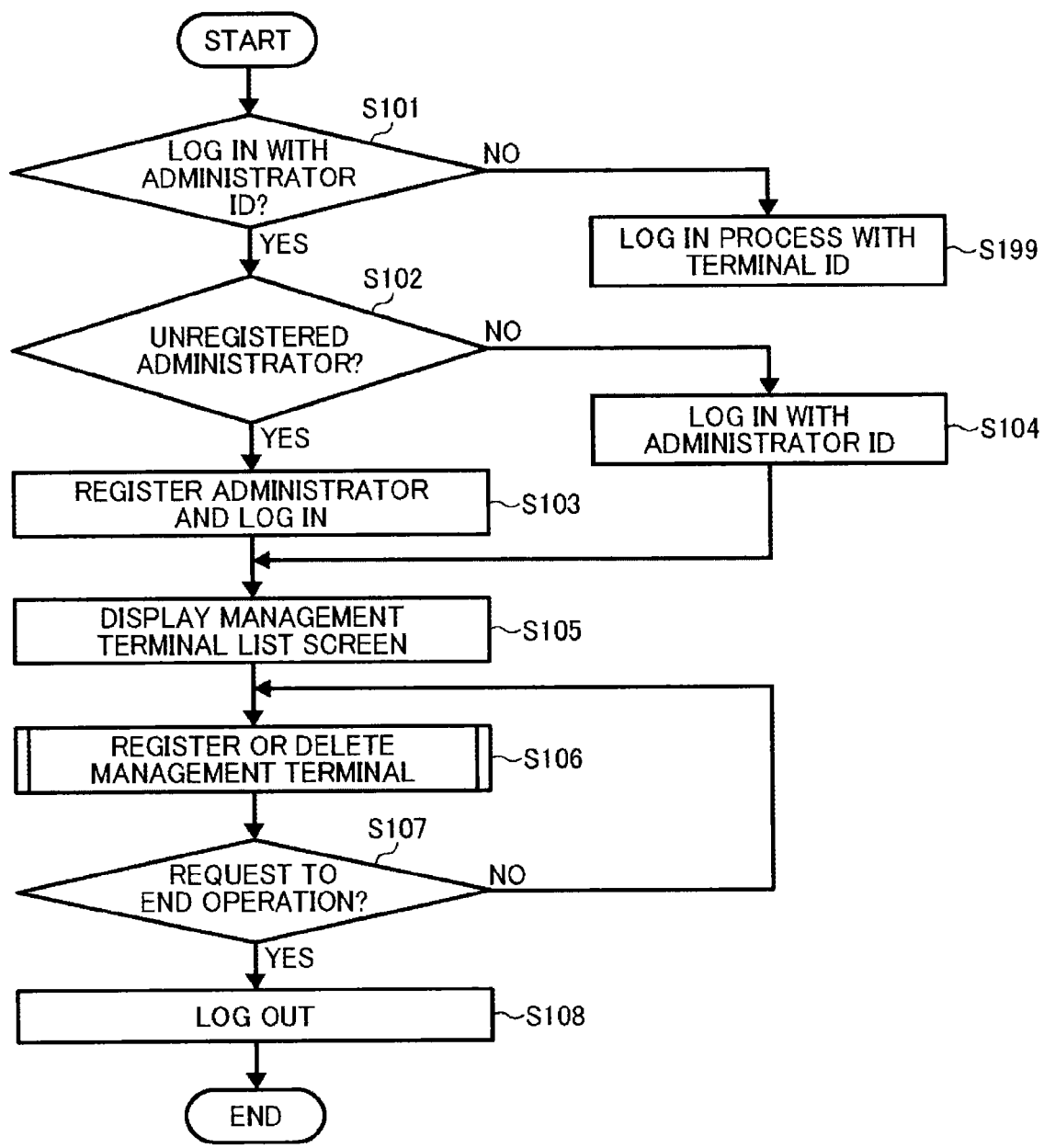
FIG. 16 is a flowchart illustrating operation of managing a terminal, performed by the transmission management system of FIG. 1, according to an example embodiment of the present invention.

Referring now to FIGS. 16 to 23, operation of managing terminals is explained. FIG. 16 is a flowchart illustrating operation of managing terminals, performed by the transmission management system 40, according to an example embodiment of the present invention.

At S101, the first authenticator 82 of the counterpart registration system 80 determines whether a login request is received from the administrator terminal 20, which is operated by the administrator, with an administrator ID of the administrator, through the communication network 2. When it is determined that the login request with the administrator ID is received ("YES" at S101), the operation proceeds to S102. When it is determined that the login request with the administrator ID is not received ("NO" at S101), which includes the case where a login request with a user ID is received, the operation proceeds to S199. At S199, the counterpart registration system 80 performs a login process with the user ID. In this example, the transmission terminal 10, which logs in with the user ID, can only register a candidate counterpart terminal to its own candidate list prepared for that terminal 10. In contrary, the administrator terminal 20, which logs in with the administrator ID, can register a candidate counterpart terminal to candidate lists of management terminals belonging to the group being managed by the administrator.

FIG. 17 is a conceptual diagram of an authentication screen of the transmission management system 40. Prior to the login request at S101, the screen data generator 86 displays, via the first communicator 81, an authentication screen illustrated by way of example in FIG. 17 on the administrator terminal 20 operated by the administrator.

When administrator authentication is selected on the screen of FIG. 17, the counterpart registration system 80 determines to proceed to S102. When terminal authentication is selected on the screen of FIG. 17, the counterpart registration system 80 determines to proceed to S199.

The screen data illustrated in FIGS. 17, 18, 19, and 21 to 23 are stored in a memory of the screen data generator 86. Alternatively, these screen data may be stored in the memory 60. In such case, the data processor 84 may read out any one of the screen data according to an instruction from the screen data generator 86.

Referring back to FIG. 16, when it is determined that the login request with the administrator ID is received at S101 ("YES" at S101), the operation proceeds to S102. At S102, the first authenticator 82 determines whether administrator information such as the administrator ID and the password, is unregistered in the administrator DB 65. When it is determined that the administrator information is registered in the administrator DB 65 ("NO" at S102), at S104, the first authenticator 82 permits login. When it is determines that the administrator information is not registered, that is, unregistered ("YES" at S102), the operation proceeds to S103. At S103, the screen data generator 86 displays, via the first communicator 81, a registration screen on the administrator terminal 20 operated by the administrator. After registering the administrator information input through the registration screen, to the administrator DB 65, the counterpart registration system 80 logs in the administrator. An example of the case in which administrator information is unregistered in the administrator DB 65 is, for example, the case in which the administrator is registered for the first time using an initial setting password.

FIG. 18 is a conceptual diagram of an administrator registration screen. At S103, for example, the administrator registration screen illustrated in FIG. 18 is displayed on the administrator terminal 20.

Referring back to FIG. 16, at S105, the screen data generator 86 generates a management terminal list screen illustrated in FIG. 19, and the first communicator 81 transmits data of the management terminal list screen to the administrator terminal 20, thereby displaying the screen. FIG. 19 is a conceptual diagram of the management terminal list screen. The management terminal list screen includes a list of transmission terminals 10 managed by the administrator who logs in.

Specifically, the first extractor 85 searches the administrator DB 65 using the administrator ID received at the counterpart registration system 80 as a search key to obtain the group ID associated with the administrator ID. The first extractor 85 searches the group management DB 64 using the obtained group ID as a search key to obtain the group name and the management terminal ID, which are respectively associated with the group ID. The first extractor 85 searches the candidate list management DB 63 using the obtained management terminal ID, which corresponds to the starting terminal ID, as a search key to obtain a terminal ID of each one of candidate counterpart terminals for the starting terminal ID. Based on this information obtained at the first extractor 85, the screen data generator 86 generates the management terminal list screen.

The management terminal list screen, which is generated as described above, displays the name and the terminal ID of the management terminal that are obtained from the terminal management DB 62, and the terminal IDs of the candidate counterpart terminals associated with the starting terminal ID obtained from the candidate list management DB 63 (that is the same as the terminal ID in the terminal management DB 62), in association with one another. The management terminal list screen further displays the "Delete" key for each management terminal ID. When the "Delete" key is selected, a request for deleting the terminal 10 indicated by the corresponding terminal ID from the management terminals is accepted. The screen of FIG. 19 indicates that the administrator A manages a plurality of groups including the group G1 (first sales division) and the group G2 (second sales division). Further, as management terminals of the group G1 (first sales division), the transmission terminal 10*aa* with the name "AA terminal", and the transmission terminal 10*ab* with the name "AB terminal" are managed.

The management terminal list screen further includes the "Register management terminal" key and the "Delete terminals by group" key. The "Register management terminal" key, when selected, accepts a request for newly registering a transmission terminal 10 as a management terminal. The "Delete terminals by group" key, when selected, accepts a request for deleting the management terminals 10 that are registered in the group. More specifically, the "Delete terminals by group" key is selected, when requesting to delete all transmission terminals 10 belonging to the group being displayed as a corresponding index is currently selected. The "Delete" key, which is displayed for each management terminal, is selected when requesting to delete a specific corresponding terminal 10 from the group. The management terminal list screen further displays the "Log out" key, which, when selected, requests to log out. These keys may be selected by the administrator, for example, through pressing the key with any desired input device or a finger.

Assuming that any one of the keys "Register management terminal", "Delete terminals by group", and "Delete" is selected, at S106, the counterpart registration system 80 performs the management terminal registration and deletion process, which will be described later.

At S107, the determiner 86 determines whether a request for ending operation is received, for example, by determining whether the "Log out" key is selected by the administrator. When it is determined that the request for ending operation is received ("YES" at S107), the operation proceeds to S108. At S108, the counterpart registration system 40 logs out the administrator terminal 20. When it is determined that the request for ending operation is not received ("NO" at S107), the operation returns to S106.

(Registration or Deletion of Management Terminal)

Figure 20:
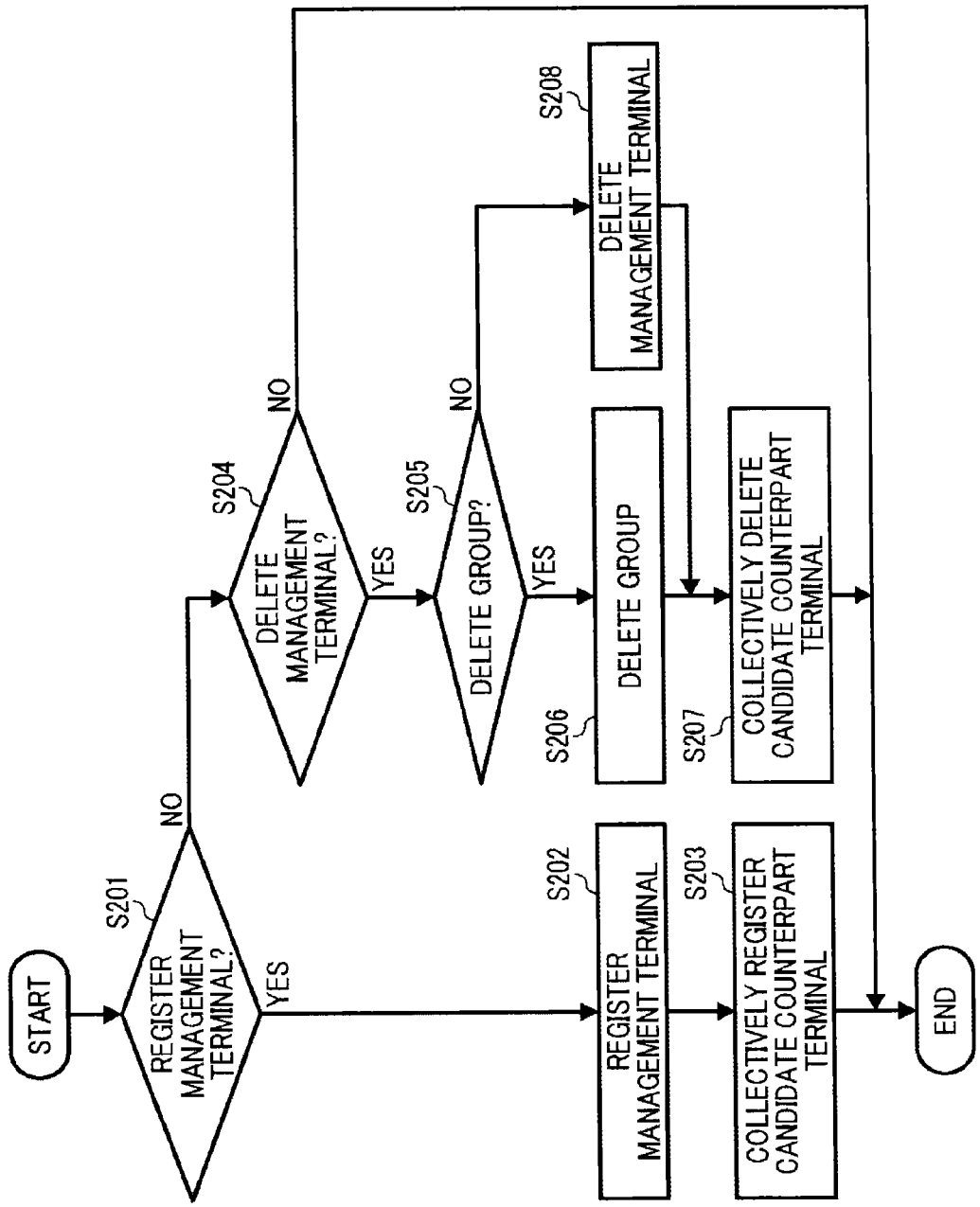
FIG. 20 is a flowchart illustrating operation of registering or deleting a management terminal, performed by the transmission management system of FIG. 1, according to an example embodiment of the present invention.

Referring now to FIGS. 19 to 23, operation of registering or deleting a management terminal, performed at S106 of FIG. 16, is explained according to an example embodiment of the present invention. FIG. 20 is a flowchart illustrating operation of registering or deleting a management terminal, performed by the counterpart registration system 80. FIG. 21 is a conceptual diagram illustrating a management terminal registration screen. FIGS. 22 and 23 are each a conceptual diagram illustrating a confirmation screen, which confirms deletion of a management terminal.

At S201, the determiner 87 determines whether to register a management terminal, based on determination of whether the "Register management terminal" key is selected by the administrator. When the "Register management terminal" key is selected ("YES" at S201), the determiner 87 determines to register a management terminal, and the operation proceeds to S202. At S202, the screen data generator 86 sends a management terminal registration screen, such as the screen illustrated in FIG. 21, to the administrator 20 through the first communicator 81.

The administrator terminal 20 displays the management terminal registration screen of FIG. 21. The management terminal registration screen includes a pull-down menu, which allows the administrator to select a group to which a management terminal is to be registered, from a list of groups. The management terminal registration screen further includes a plurality of entry fields ("registration terminal ID"), for allowing the administrator to input a terminal ID of the terminal 10 that the administrator wants to register to the selected group. Assuming that the administrator selects the group from the pull-down menu, inputs the terminal ID of the terminal 10 in the "registration terminal ID" entry field, and selects the "Register" key, the administrator terminal 20 sends a registration request to the counterpart registration system 80. The registration request includes the group ID of the selected group, the terminal ID entered in the entry field, and the administrator ID of the administrator who logs in. The counterpart registration system 80 receives the registration request at the communicator 81.

At S202, the data processor 84 refers to the group management DB 64 of the terminal management system 50, to specify a record including the group ID of the group selected using the management terminal registration screen of FIG. 21, and adds the terminal ID that is input through the management terminal registration screen of FIG. 21 in a "management terminal ID" column in the specified record. In this manner, the transmission terminal 10 is newly registered as a management terminal for management by the administrator.

At S203, the data processor 84 registers the newly registered management terminal, as a candidate counterpart terminal for the transmission terminal 10 of the same group. The data processor 84 further registers the transmission terminal 10 of the same group, as a candidate counterpart terminal for the newly registered management terminal.

More specifically, the data processor 84 refers to the candidate list management DB 63 of the terminal management system 50 to specify a record including the terminal ID of the terminal 10 that is already registered in the selected group, as a starting terminal ID, and adds the terminal ID of the newly registered management terminal in a candidate counterpart terminal ID column of the specified record. The data processor 84 further refers to the candidate list management DB 63 of the terminal management system 50 to specify a record including the terminal ID of the newly registered management terminal, which is input, as a starting terminal ID, and adds the terminal ID of the terminal 10 of the same group in a candidate counterpart terminal ID column of the specified record.

At S201, when it is determined that registration of a management terminal is not requested ("NO" at S201), the operation proceeds to S204. At S204, the counterpart registration system 80 further determines whether to delete a management terminal, that is, whether the "Delete terminals by group" key or the "Delete" key is selected. When it is determined that a management terminal is to be deleted ("YES" at S204), the operation proceeds to S205.

At S205, the determiner 87 of the counterpart registration system 80 determines whether terminals in the selected group is deleted, that is, the "Delete terminals by group" key is selected. When it is determined the group is to be deleted ("YES" at S205), the operation proceeds to S206. At S206, the data processor 84 obtains the group ID of the group that is displayed as an index of the screen, and the administrator ID obtained at S101, and deletes the obtained group ID that is associated with the obtained administrator ID from the administrator DB 65. For example, referring to the management terminal list screen of FIG. 19 where the "First sales division" is selected, it is assumed that the "Delete terminals by group" key is selected. In such case, the group ID "G001" is deleted in the administrator DB 65, specifically, from the "group ID" field associated with the administrator ID of the administrator who logs in.

In this example, before the data processor 84 deletes the group ID from the administrator DB 65, the screen data generator 86 may send data of a confirmation screen of FIG. 22, to the administrator terminal 20 operated by the login administrator, via the first communicator 81. The confirmation screen of FIG. 22 confirms the administrator whether to delete the selected group. When the "OK" key is selected by the administrator, the data processor 84 performs 5206 of deleting the group. When the "CANCEL" key is selected by the administrator, the data processor 84 ends operation of FIG. 20 without performing 5206.

At S207, the data processor 84 deletes the terminals used to be in the group that is deleted, from the candidate list for the terminals in the group that is deleted. More specifically, the data processor 84 refers to the candidate list management DB 63 of FIG. 10, to specify a record including the terminal ID of the terminal 10 that is registered in the deleted group, as a starting terminal ID. The data processor 84 deletes the terminal ID of the terminal 10 that is registered in the deleted group, from the candidate counterpart terminals for the terminal 10 that is registered in the deleted group. For example, as illustrated in FIG. 19, it is assumed that the "Delete terminals by group" key is selected in a state in which the "first sales division" index has been selected on the management terminal list screen. In the case where the transmission terminal 10aa in the "first sales division" group serves as a starting terminal, the terminal ID "01 ab" of the terminal 10ab similarly included in the deleted group "first sales division" is deleted from the terminal ID of a candidate counterpart terminal associated with the terminal ID "01aa" of the transmission terminal 10aa. Similarly, in the case where the transmission terminal 10ab in the "first sales division" group serves as a starting terminal, the terminal ID "01aa" of the terminal 10aa similarly included in the deleted group "first sales division" is deleted from the terminal ID of a candidate counterpart terminal associated with the terminal ID "01 ab" of the transmission terminal 10ab.

As described above, when deleting a group from one or more groups to be managed by an administrator, a record of the terminal in the group to be deleted, that is stored as a starting terminal ID in the candidate list management DB 63, is not deleted. The terminal ID of the terminal 10 in the group is deleted from candidate counterpart terminal IDs for that record.

Referring back to S205, when it is determined that the group is not to be deleted, that is, when the "Delete" key is selected for a specific terminal ("NO" at S205), the operation proceeds to S208.

At S208, the data processor 84 obtains the terminal ID of the terminal 10 corresponding to the selected "Delete" key, and the group ID associated with the administrator ID obtained at S101 in the administrator DB 65. From the group management DB of FIG. 11, the data processor 84 deletes the terminal ID of the selected management terminal, associated with the obtained group ID.

For example, referring to the management terminal list screen of FIG. 19, it is assumed that the "Delete" key is selected for the "AB terminal", while the "First Sales Division" index is selected. Referring to FIG. 11, the data processor 84 deletes the terminal ID "01 ab" of the selected terminal, from the management terminal IDs associated with the group ID "G001" of the selected group.

Further, in prior to deleting the terminal ID at S208, the screen data generator 86 may send confirmation screen data of FIG. 23, to the administrator terminal 20 of the administrator who logs in, through the first communicator 81. The confirmation screen of FIG. 23 confirms whether to delete the selected management terminal. In response to the user selection of "OK" key, the data processor 84 performs S208. When the "Cancel" key is selected, the data processor 84 ends without performing 5208.

After S208, the operation proceeds to S207. The data processor 84 refers to a record for the management terminal that is deleted at S208, which is the starting terminal, in the candidate list management DB 63. The data processor 84 deletes, from candidate counterpart terminal IDs that are associated with the deleted terminal, that is the starting terminal, the terminal IDs of one or more other terminals belonging to the same group to which the deleted terminal used to belong. The data processor 84 further deletes, for a record corresponding to each one of the one or more other terminals of the same group, that is, the starting terminal, the terminal ID of the deleted terminal, from the candidate counterpart terminal IDs associated with the other terminal of the same group.

For example, referring to the management terminal list screen of FIG. 19, it is assumed that the "Delete" key is selected for the "AB terminal", while the "First Sales Division" index is selected. Referring to FIG. 10, the data processor 84 refers to the candidate list management DB 63 to refer to a record for the terminal 10ab, that is, the starting terminal, and deletes the terminal ID "01 aa" of the other terminal 10aa in the same group from candidate counterpart terminals 10 associated with the terminal ID "01aa". Similarly, the data processor 84 refers to a record for the other terminal 10aa of the same group in the candidate list management DB 63 (FIG. 10), that is the starting terminal, and deletes the terminal ID "01ab" of the terminal 10ab from candidate counterpart terminal IDs associated with the terminal ID "01aa" of the other terminal 10aa in the same group.

After S203 or S207, the operation of FIG. 20 ends to proceed to S107 of FIG. 16.

As described above, in one example, in response to receiving a request for registering a transmission terminal in a group being managed by an administrator, from an administrator terminal operated by the administrator, the transmission management system 40 not only registers the terminal to that group, but also registers that terminal to a list of candidate counterpart terminals for the other terminals that have been registered to that group. The transmission management system 40 further registers the other terminals that are previously registered in that group, as a candidate counterpart terminal of that newly registered terminal.

Accordingly, the administrator needs to only instruct to register a terminal to be under management by the administrator, such that further operation of registering the terminal to a candidate list management DB 63 is not needed. Further, the transmission management system 40 automatically registers the terminal to the candidate list management DB 63, only for the group being managed by the administrator, thus improving security.

In another example, in response to receiving a request for deleting a transmission terminal from a group being managed by an administrator, from an administrator terminal operated by the administrator, the transmission management system 40 not only deletes the terminal from that group, but also deletes that terminal from a list of candidate counterpart terminals for the other terminals that have been registered to that group. The transmission management system 40 further deletes the other transmission terminals, from a list of candidate counterpart terminals for that terminal to be deleted.

Accordingly, the administrator needs to only instruct to delete a terminal from a group under management by the administrator, such that further operation of deleting the terminal from a candidate list management DB 63 is not needed. Further, the transmission management system 40 automatically deletes the terminal from the candidate list management DB 63, only for the group being managed by the administrator, thus improving security.

In another example, in response to receiving a request for deleting a group being managed by an administrator, from an administrator terminal operated by the administrator, the transmission management system 40 not only deletes that group from groups being managed by the administrator, but also deletes transmission terminals from a list of candidate counterpart terminals for the transmission terminals that have been registered to that group to be deleted.

Accordingly, the administrator needs to only instruct to delete a group from the groups under management by the administrator, such that further operation of deleting the terminal from the candidate list management DB 63 is not needed. Further, the transmission management system 40 automatically deletes the terminal from the candidate list management DB 63, only for the group being managed by the administrator, thus improving security.

Note that the transmission management system 40 is applicable to an arbitrary system as long as the system is a communication system in which transmission terminals 10 are capable of communicating with each other. For example, the transmission management system 40 is applicable to a teleconference system, a video conference system, a sound conference system, a sound phone system (including a mobile phone system), a text chat system, or a white-board sharing system. In addition, transmission terminals 10 may be dedicated terminals for the above-described communication system or game-dedicated terminals, or may be general terminals such as personal computers, smart phones, mobile phone terminals, or tablet terminals. In addition, it is sufficient for the terminal management system 50 and the counterpart registration system 80 to be information processing apparatuses including the functional blocks illustrated by way of example in FIG. 7, and the terminal management system 50 and the counterpart registration system 80 may be dedicated server apparatuses or general terminal apparatuses.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A transmission management system that manages a plurality of transmission terminals, comprising:
   a memory configured to store:
      first association information that associates administrator identification information for identifying an administrator with management terminal identification information for identifying one or more management terminals being managed by the administrator; and
      second association information that associates, for each one of the plurality of transmission terminals, terminal identification information for identifying a terminal with candidate counterpart terminal identification information for identifying one or more candidate counterpart terminals, to indicate that the terminal is capable of requesting to start communication with the candidate counterpart terminals;
   a receiver configured to receive a request for deleting a specific management terminal from being under management of a specific administrator, the request including specific terminal identification information of the specific terminal to be deleted and specific administrator identification information of the specific administrator; and
   a processing circuitry configured to
      delete the specific terminal identification information from the management terminal identification information being associated with the specific administrator identification information by the first association information,
      specify one or more management terminals being managed by the specific administrator other than the specific terminal being deleted using the first association information, and
      delete the specific terminal identification information of the specific terminal being deleted, from candidate counterpart terminal identification information associated with each one of the other management terminals by the second association information.

2. The transmission management system of claim 1, wherein the processing circuitry further deletes terminal identification information of the other management terminals, from candidate counterpart terminal identification information associated with the specific terminal identification information of the specific terminal being deleted by the second association information.

3. The transmission management system of claim 1, further comprising:
   a transmitter configured to send notification indicating that the specific terminal is deleted from a list of candidate counterpart terminals, respectively, to the other management terminals being managed by the specific administrator.

4. The transmission management system of claim 2, further comprising:
   a transmitter configured to send notification indicating that the other terminals are deleted from a list of candidate counterpart terminals, to the specific terminal being deleted.

5. The transmission management system of claim 1, wherein the first association information includes:
   third association information that associates, for each administrator, the administrator identification information with group identification information for identifying one or more groups of management terminals being managed by the administrator; and
   fourth association information that associates, for each group, the group identification information and management terminal identification information for identifying one or more management terminals belonging to the group.

6. A transmission system, comprising:
   the transmission management system of claim 1; and
   one or more transmission terminals each connected to the transmission management system through a network.

7. A method of managing a plurality of transmission terminals, comprising:
   storing in a memory first association information that associates administrator identification information for identifying an administrator with management terminal identification information for identifying one or more management terminals being managed by the administrator;

storing in the memory second association information that associates, for each one of the plurality of transmission terminals, terminal identification information for identifying a terminal with candidate counterpart terminal identification information for identifying one or more candidate counterpart terminals, to indicate that the terminal is capable of requesting to start communication with the candidate counterpart terminals;

receiving a request for deleting a specific management terminal from being under management of a specific administrator, the request including specific terminal identification information of the specific terminal to be deleted and specific administrator identification information of the specific administrator;

deleting the specific terminal identification information from the management terminal identification information being associated with the specific administrator identification information by the first association information;

specifying one or more management terminals being managed by the specific administrator other than the specific terminal being deleted using the first association information; and deleting the specific terminal identification information of the specific terminal being deleted, from candidate counterpart terminal identification information associated with each one of the other management terminals by the second association information.

8. The method of claim 7, deleting terminal identification information of the other management terminals, from candidate counterpart terminal identification information associated with the specific terminal identification information of the specific terminal being deleted by the second association information.

9. The method of claim 7, wherein the first association information includes:

third association information that associates, for each administrator, the administrator identification information with group identification information for identifying one or more groups of management terminals being managed by the administrator; and fourth association information that associates, for each group, the group identification information and management terminal identification information for identifying one or more management terminals belonging to the group.

10. A non-transitory recording medium which, when executed by one or more processors, cause the processors to perform a method of managing a plurality of transmission terminals, comprising:

storing in a memory first association information that associates administrator identification information for identifying an administrator with management terminal identification information for identifying one or more management terminals being managed by the administrator;

storing in the memory second association information that associates, for each one of the plurality of transmission terminals, terminal identification information for identifying a terminal with candidate counterpart terminal identification information for identifying one or more candidate counterpart terminals, to indicate that the terminal is capable of requesting to start communication with the candidate counterpart terminals;

receiving a request for deleting a specific management terminal from being under management of a specific administrator, the request including specific terminal identification information of the specific terminal to be deleted and specific administrator identification information of the specific administrator;

deleting the specific terminal identification information from the management terminal identification information being associated with the specific administrator identification information by the first association information;

specifying one or more management terminals being managed by the specific administrator other than the specific terminal being deleted using the first association information; and deleting the specific terminal identification information of the specific terminal being deleted, from candidate counterpart terminal identification information associated with each one of the other management terminals by the second association information.

* * * * *